United States Patent [19]

Knapp

[11] Patent Number: 5,032,185
[45] Date of Patent: Jul. 16, 1991

[54] METHOD AND APPARATUS FOR REMOVING PARAFFIN FROM A FOULED PIPELINE

[76] Inventor: Kenneth M. Knapp, 4018 W. Main, Houston, Tex. 77027

[21] Appl. No.: 526,018

[22] Filed: May 21, 1990

[51] Int. Cl.$^5$ ............................................. B08B 9/04
[52] U.S. Cl. ............................ 134/22.11; 15/104.061; 15/104.062
[58] Field of Search .................... 134/22.11, 22.12; 15/104.061, 104.062

[56] References Cited

U.S. PATENT DOCUMENTS 3,277,508  10/1966  Knapp ........................... 15/104.061
4,083,076  4/1978   Girard .......................... 15/104.061

Primary Examiner—Theodore Morris
Assistant Examiner—Saeed Chaudhry
Attorney, Agent, or Firm—Gunn, Lee & Miller

[57] ABSTRACT

The present disclosure sets forth a method of pigging a paraffin coated pipeline. It is scrubbed to dislodge a paraffin coating by sequentially passing through the pipeline subject to flowing oil pressure a sequence of pigs. The first pig has an elongate cylindrical body formed of very light foam of open cell construction, typically polyurethane, and subsequent pigs are formed of the same external pig body. In sequence, the pigs are provided with increasingly large central cores formed of a heavier foam so that the first central core has a diameter of about ten percent of diameter and the last approaches about seventy, but not one hundred percent of the diameter.

19 Claims, 1 Drawing Sheet

METHOD AND APPARATUS FOR REMOVING PARAFFIN FROM A FOULED PIPELINE

BACKGROUND OF THE DISCLOSURE

This disclosure is directed to a method and apparatus for cleaning a pipeline. More particularly, it is intended for cleaning a pipeline which has an accumulated coating of paraffin in the line. Even more specifically, it is intended for the progressive removal of paraffin coatings in the pipeline during continued use in operation of the pipeline so that the pipeline need not be shut down. Rather, the cleaning is carried out utilizing the fluid drive from pumping oil based materials through the pipeline giving rise to the paraffin coating.

Cleaning pipelines is believed to be well known and is done as a regular matter for maintaining pipeline flow capacity. The coatings which form in a pipeline differ dependent on a number of factors. For instance, fresh water normally carries mineral constituents which will plate out and form a kind of hard crust. In those portions of the country where the water is highly mineralized, the coatings form a type of boiler scale which is accreted over a period of time to thereby close off the ID of the pipe generally uniformly by forming an every thickening deposit. It is typically carbonate which builds up a chalky deposit which is a fairly brittle adherent layer. It can build up to the point where the pipeline is nearly completely plugged. This normally builds up over a long period of time, thereby resulting in a deposit which somewhat resembles gypsum board, sheetrock or the like. The primary difference is that it is concentrically circular in shape.

In water lines which deliver cooling water from the ocean or other bodies of water which have living cells therein, it is also not uncommon for the cells to deposit in the line and place such deposits in the line to reduce the flow capacity. Such deposits can range from oyster shells to barnacles and other living organisms which may live in salt water, brackish water and many of which even live in fresh water. Both types of deposits mentioned above have certain advantages, namely primarily that they are hard, and can even be brittle. The present disclosure is directed to cleaning soft paraffin from a line in circumstances where heavy molecules coat out from a flow of oil produced from a formation or a well which connects with several gathering lines which form a field line extending to a processing plant. Oil produced from a well typically includes constituents having a generalized paraffin series formula of $C_nH_{2n+2}$. In the foregoing n is a whole number positive integer. Where n is under three or four, the molecule defined thereby is normally gaseous at room temperature. Eventually, where n increases over about six or seven, that molecule tends to liquify, and where n increases further, the molecule will ultimately solidify. For the larger weight molecules in a stream of oil from a formation, there is a tendency to solidify. A paraffin type coating is often formed in a gathering line. Coating is dependent on many factors including the temperature of the exterior of the line, the temperature of the produced oil, the mix of the constituents of the paraffin series in the flow, and many other similar factors. Suffice it to say, there is a generalized pattern in which paraffin coatings are formed in the pipeline.

A paraffin coating should be contrasted with the type of coating which collects on the interior of water lines. Those coatings are quite hard having the consistency of sheetrock in many instances. Those coatings are somewhat brittle compared with paraffin coatings. Paraffin coatings are more like a heavy grease or wax which will maintain a shape but which is not brittle and which can be smudged but not broken. Pipeline cleaning is altogether a different problem with a paraffin coating that is soft and resilient compared with a brittle coating formed of carbonates in a water line. Cleaning is therefore materially altered.

Consider a pipeline which requires cleaning. Assume that the coating is somewhat thin and may or may not include rust or mill scale on the pipe, and some deposit of relatively thin nature on the interior of the pipe. Pigs made heretofore have approached that problem primarily with scratching members such as tungsten carbide particles imbedded on the exterior surface. Another type of pig includes wire bristles arranged in stripped patterns around a pig body. Generally, the pig bodies have been relatively stiff to hold or support the sharp points deployed around the exterior of the pig against the pipe so that small chisel like points cut the coating and ultimately clean the pipeline. Many pigs heretofore have been provided with a relatively stiff body with extremely sharp numerous points such as the bristles or tungsten carbide particles mentioned above.

The present disclosure sets forth a pig for cleaning soft coatings at the opposite extreme. Light weight pigs have been known heretofore, but the pig of the present disclosure is a two foam pig which has a central core and an outer foam body. The outer foam body is extremely light in material. That is, it is preferably formed of an open cell foam weighing between about one and four pounds per cubic foot. It is fabricated full gauge, that is, the cylindrical foam body has a diameter equal to the ID of the pipeline to be cleaned. A small concentric passage is formed in the foam body and a slightly heavier foam is placed in that passage. This defines an elongate central stiffening member which is only slightly stiffer but which is nevertheless sufficient to provide some body and structural integrity to the pig. This enables the pig to maintain a full gauge profile thereby totally plugging the pipeline and enabling the fluid drive through the line to force the pig along the pipeline. Moreover, it is sufficiently light in structure that it may deform when encountering the soft paraffin build up. On repeated passes, the size of the pig remained unaltered, but nevertheless, the central portion is made larger. That is to say, the slightly stronger, stiffer foam becomes larger, enabling the pig body to remain structurally intact and to thereby push the paraffin along the line. The paraffin does not break, fracture or tear free from the wall of the pipe in the same fashion as does deposited carbonates in water lines. Rather, the paraffin is dislodged in a different fashion. This difference causes the paraffin to ultimately emerge from the pipeline after having been shaped and reshaped when pushed through the pipeline. On this basis, the paraffin has a different shape resulting from a detachment mechanism. The pig is able to ride over tough lumps of paraffin adhering to the pipeline. They might be smudged or smeared as the pig deforms in riding over the deposits. In any event, multiple passes by a sequence of pigs having a steadily larger central portion in the pig enables the pigs to break loose or dislocate the paraffin as a pliable resilient body in a sequence which prevents line plugging. Line plugging is thus avoided, and the pigs are sequentially retrieved along with pieces of paraffin which break free. After multiple passes, the last pig through the pipeline can be formed with a central reinforcing so that most of the paraffin in the line can be cleaned and forced from the line. When this is completed, the line then at most has only a thin layer of paraffin of relatively uniform thickness left on the wall of the pipe, at which time stiffer bodied pigs with more aggressive bristles or scraping attachments can be used. This prepares the pipeline for the last cleaning step.

The foregoing sets forth a pig and a method of cleaning paraffin coated pipelines. More details will become more readily apparent on consideration of the below written specification which considered in conjunction with the drawings sets forth both the apparatus and method of use. Other details will be understood at this juncture.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
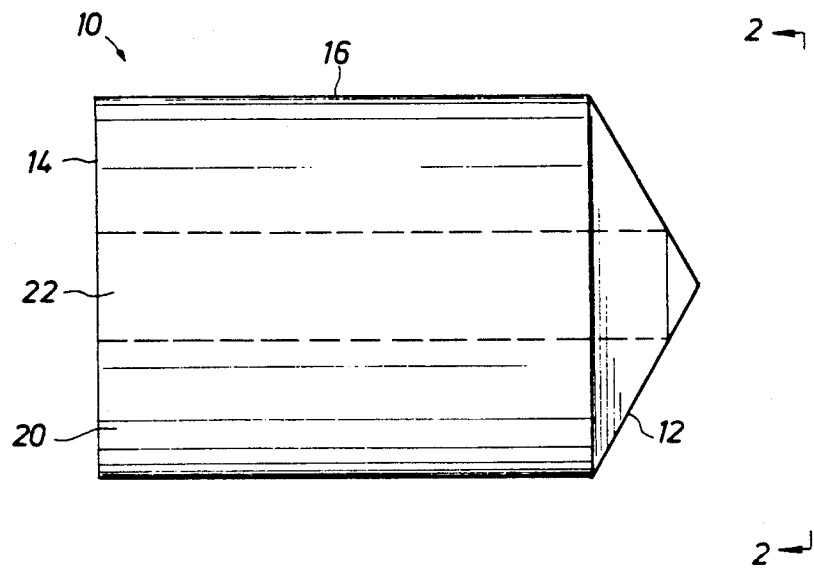
FIG. 1 is a side view of a pipeline pig constructed in accordance with the teachings of the present disclosure.

Attention is directed to FIG. 1 of the drawings where the numeral 10 identifies a pig constructed in accordance with the present disclosure. It is an elongate cylindrical pig. It has a forward face 12 and a rear face 14. They can be planar and parallel. Conveniently, the forward end is normally bullet shaped at least to some measure. The outer wall 16 is contacted against the inner wall of the pipe to be cleaned. The outer wall has a diameter which is full gauge with respect to the pipeline. Thus, if the pipeline has a nominal twelve inch gauge, the pig is twelve inches in diameter. It has a length which is typically about two, and not more than four times the diameter. There is no need to make the pig any longer than that which simply involves excessive materials to make it longer. The pig, however, should be longer than about one and one half diameters, ideally more than about two diameters. This prevents the pig from wadding up and compressing into a small sphere or crumpled mass whereby it might become positioned transverse to the pipe and thereby jam. It is intended to traverse the pipeline with the bullet shaped nose at the forward end and the trailing body of the pig concentric in the pipeline.

For purposes of discussion, assume that the pig 10 is intended to traverse a twelve inch pipeline. Using that dimension as an example, certain key features of the present disclosure will be set forth. The pig is formed of two major portions. There is an outer body portion 20 and axial core portion 22. The core portion is located concentric within the core on the centerline axis. The core portion is made of a different type material. The outer portion of the pig is an open cell foam of very light construction. A typical range is about one to four pounds per cubic foot. The preferred material is foamed polyurethane. It preferably has open cell construction so that it functions somewhat like a sponge. That is, liquid may travel from the back end through the body of the pig and emerge out the front face 12. This open cell construction assures that the pig does not block the pipeline passage; in other words, the pig is constructed so that it completely fills the cross section area of the pipe and yet fluid may flow through the pig. Obviously, the pig is forced along by the fluid flow in the pipe and maintains the outer surface 16 in contact with the pipe for wiping purposes. The foam is sufficiently light that a narrow constriction in the pipeline can be traversed. For instance, if the pig encounters a constriction of fifty percent diameter, the pig could squeeze through this constriction. The build-up of paraffin in the pipeline might well engender such a constriction. The pig is therefore able to traverse such a build-up without lodging there and locking the pipeline. The pig is normally able to squeeze and otherwise deform so that it travels with the flow through such a constriction. When passing through the constriction, the constriction is enlarged because the pig will dislodge by wiping action a certain portion of the paraffin in the constriction. It is desirable that at least a portion of the paraffin in the constriction be dislodged. However, it is not desirable that excessive wiping occur because that leads to excessive dislodgment and runs the risk of plugging downstream. If the pig were one hundred percent efficient in dislodging paraffin coatings on the pipe, this would run the risk of pieces of dislodged paraffin collecting farther downstream at another constriction so that they might accumulate, and being somewhat pliable, they might accumulate and deform into a very substantial plug, and thereby completely stop fluid flow either by plugging with paraffin or the paraffin and the pig considered collectively.

The body on the exterior presents a soft pliable foam face for contact against the pipe. The pipe and accumulations of paraffin on the pipe are thus cleared and wiped. A portion, but not all, of the paraffin is thus moved by wiping and dislodgment. This is accomplished by the highly deformable exterior face of the pig. The body is quite soft for the reasons mentioned to enable this to happen. The body is quite soft to enable the pig to accomplish this whereby some portion of the paraffin constrictions in the pipeline can be wiped, dislodged or otherwise loosened to be swept along the flow. The pig, however, is also provided with a central core. Again using the example of a twelve inch line to be cleaned with a twelve inch pig, the central core is preferably about one or two inches in diameter. It is preferably formed of a slightly stiffer foam such as foamed polyurethane made into an open cell foam having a density which is about two pounds per cubic foot greater at a minimum than the outer foam body. Thus, if the outer foam 20 has a density of three pounds per cubic foot, this foam will have a density of five pounds per cubic foot, or even greater. A typical range is about four to twelve pounds per cubic foot. It is not desirable to go much above this in foam density because the increase in cost requisite with heavier density foams does not obtain much improvement in performance.

Figure 2:
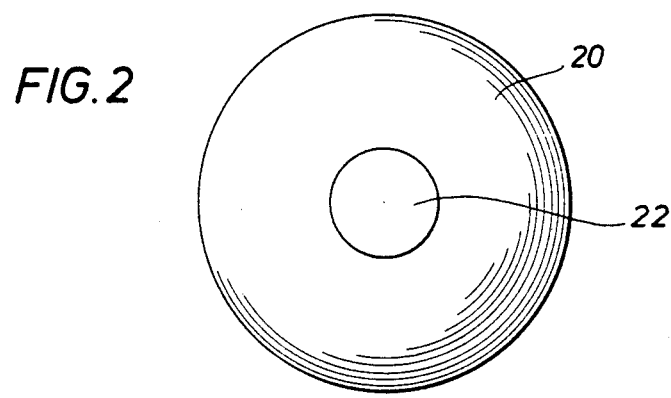
FIG. 2 is an end view of the pig shown in FIG. 1.

An important factor is the diameter of the harder foam core 22 compared with the diameter of the outer foam 20. The present disclosure contemplates the fabrication of a series of pigs which are otherwise identical except for this dimension. Thus, the first pig placed in a line can be a simple cylinder of foam having only one weight of foam and having the shape shown in FIGS. 1 and 2. The second, however, is provided with a central core 22 which has a very small diameter. An acceptable diameter is about ten percent of the pig diameter. The sequence of pigs is provided with an increased diameter central core 22. The sequence can be stepped increases from ten percent to twenty percent, and then thirty percent, forty percent, fifty percent, etc. The core 22 can be increased to the point of about eighty or ninety percent of the diameter of the outer foam 20. There generally is no need to make a pig which is one hundred percent of the stiffer foam. At the point where the central core 22 is about eighty percent and the outer foam is only a thin coating thereon, it is generally desirable to switch to an entirely different type of pig construction. This will become more apparent in some of the details given below as an example of operation.

Consider an exemplary pipeline to be cleaned using the present disclosed apparatus and method of cleaning. Assume a twelve inch pipeline which is ten miles long which is delivering produced oil from one location to another. Further presume that the pressure in the pipeline is in the range of 200 psi. Assume further that an unknown quantity of paraffin had coated the pipeline on the interior along the length. Assume further that this collection of paraffin in the pipeline has reduced flow from the original flow by approximately fifty percent. In that instance, it suggests that a substantial build-up of paraffin has occurred at one or many places along the length of the pipeline. In that context, a pig launcher is installed at the inlet end of the pipeline and a trap is installed at the outlet end. A first pig is loaded in the pipeline and is forced through the pipeline utilizing the pipeline fluid flow to drive the pig. The first pig that is placed in the pipeline is a full gauge pig which is formed with the outer body 20 in accordance with this disclosure. The central core 22 is either omitted or is a small core which is about one inch in diameter. The pig traverses the full length of the pipeline. It is sufficiently long that it will not tumble or become positioned transverse to the axis of the pipeline. Moreover, it lightly wipes the interior surface. Nevertheless, even though the wiping is light and the contact is not likely to abrade substantial volumes of paraffin, nevertheless, a significant portion of the paraffin in the line will be dislodged. As a generalization, the paraffin hardens with age and where it involves heavier molecules. Thus, the last layer of paraffin in the coating is normally not well anchored. It can be dislodged with a gentle smudging or wiping action. The first pig through the pipeline has almost no chance of sticking or lodging, and it will dislocate a substantial portion of the paraffin. Thereafter, another pig is placed in the pipeline. It might have a central core of ten percent of the diameter or in this instance, a pig of one inch central core. Again, the outer body remains the same diameter. This pig will again traverse the pipeline and provide some paraffin dislodgment which will be flushed from the pipeline with the discharge. Repetitively, each pig is recovered and the next pig is launched. As the pigs have a larger central core, cleaning becomes more vigorous.

Figure 3:
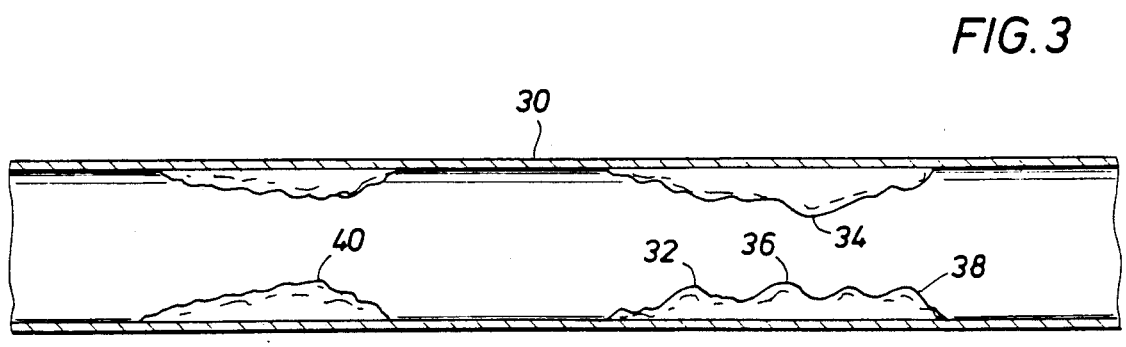
FIG. 3 is a sectional view through a section of pipeline to be cleaned with pigs in accordance with the present disclosure.

Going now to FIG. 3 of the drawings, a pipeline 30 has been with deposits therein and in particular irregular paraffin deposits are shown. The deposits located at 32 and 34 may be dislodged with the first pig. The deposits in the region at 36 and 38 may also be dislodged with the second or third pig. Ultimately, substantially all the deposits mentioned above and those deposits shown at 40 will likewise be dislodged. As the sequence of pigs continues through the pipeline building up to a central core of perhaps sixty or seventy percent of the diameter, the paraffin remaining the line is either smudged to a more or less uniform diameter so that high spots are eliminated or is alternately dislodged and floats out with the fluid flow and is discharged from the line. Where the paraffin is sufficiently tacky that it is only rearranged, there is a need to further clean the pipeline with a different type pig. That, however, is one ultimate benefit of the present pig and pigging procedure. The present procedure thus enables unseen narrow constrictions in the pipeline to be dislodged in a controlled sequence so that bits and particles of the paraffin coating are dislocated and flushed from the system and that any remaining paraffin is sufficiently smooth that the diameter of the pipeline is markedly improved and made uniform.

Assume for a summary that the procedure of the present disclosure contemplates the use of pigs where the central core is increased by one inch increments from one inch through ten inches. After the twelve inch pig having the ten inch hardened core has traversed the pipeline, the paraffin remaining on the sidewall typically is only a fraction of an inch thick. At this juncture, this paraffin is perhaps quite hard because it is quite old. At this juncture, it can be removed utilizing different procedures. An example would be pigging the line next with a pig equipped with a few sharp pointed bristles or the like. One useable mode of subsequent removal is shown in U.S. Pat. No. 4,603,449 of the present inventor which shows a pig having scraping discs which extend radially outwardly where the leading disc is under gauge and there are subsequent scraper discs which are larger. A similar structure to that is also set forth in U.S. Pat. No. 4,509,222 of the present inventor describing a disc equipped pig which has a body made of an outer foam and an inner foam wherein multiple discs provide a scraping action. Another kind of full gauge scraping pig is set forth at U.S. Pat. No. 4,506,401 of the present inventor where a central mandrel supports detachable tapered cups and the cups are all equipped with wire bristles. If unduly difficult coating problems exist, protruding studs from a pig body are disclosed in previously issued in U.S. Pat. No. 4,242,771 of the present inventor. This patent sets out a pig equipped with a few pointed studs for breaking or chiseling such hard accumulations. Another similar patent is U.S. Pat. No. 3,857,132 of the present inventor.

The present disclosure thus sets forth a method of pigging a pipeline to remove paraffin and more particularly a method which accomplishs the paraffin removal in a very slow controlled fashion so that it does not break free excessive quantities of paraffin thereby creating a risk of downstream plugging. The cleaning procedure takes advantage of the resiliency of paraffin build-ups and the fact that the paraffin is pliable, not brittle. It further takes advantage of the fact that the exposed paraffin layers of the build-up are made of softer paraffin while the older layers are harder and tend to have greater adherence to the surfaces.

While the foregoing is directed to the preferred embodiment, the scope thereof is determined by the claims which follow.

What is claimed is:

1. A method of cleaning a paraffin coating from an oil flowing pipeline comprising the steps of:
   (a) pigging the line with a full gauge elongate cylindrical pig having a relatively soft deformable body to enable the pig to traverse the length of the pipeline and travel past paraffin coating in the line;
   (b) subsequently pigging the pipeline with another pig having a full gauge body formed of a soft deformable foam wherein the body is reinforced by a lengthwise deformable stiffening member integrally centered in the pig body;
   (c) completing multiple subsequent pigging passes of a sequence of pipeline pigs through the pipeline with pipeline pigs provided with centered stiffening members of increasing diameter so that the last of the pipeline pigs traversing the pipeline has a largest centered stiffening member; and
   (d) recovering the dislodged paraffin from the pipeline by continuing a flow of oil through the pipeline during passage of the sequence of pipeline pigs.

2. The method of claim 1 wherein the centered stiffening members of the pigs increase in diameter from about ten percent to at least about seventy percent, but not one hundred percent of pig diameter.

3. The method of claim 2 wherein oil is pumped through the pipeline at a pressure sufficient to keep the pipeline flow during the pigging operation.

4. The method of claim 1 including the step of cleaning the pipeline with an open cell full gauge pig formed of polyurethane foam having a density of up to about four pounds per cubic foot.

5. The method of claim 1 wherein said centered stiffening member has a density at least about two pounds per cubic foot greater than than the pig body.

6. The method of claim 1 wherein the pig body is formed of two portions, the centered stiffening member having a heavier open cell foam construction and the outer portion having a lighter open cell foam construction and the two foams differ in density by at least about two pounds per cubic foot.

7. The method of claim 1 wherein the pig body has a length at least about twice the diameter of the pipeline.

8. The method of claim 1 wherein each pig has a diameter equal to the inside diameter of the pipeline.

9. The method of claim 1 wherein each pig is sized to maintain contact with the inner wall of the pipeline and each pig body has a leading end and trailing end and the leading ends thereof extend to a point and the pigs are sequentially inserted into the pipeline inlet by a pig launcher.

10. The method of claim 1 including the step of sequentially placing pigs in a pig launcher at one end of the pipeline for traveling through the pipeline during oil flow, and further wherein each pig is guided by full wall contact during pig travel.

11. A method of cleaning an internal coating from a flowing pipeline comprising the steps of:
   (a) pigging the line with a full gauge elongate cylindrical pig having a relatively soft deformable body to enable the pig to traverse the length of the pipeline and travel past an internal coating in the line;
   (b) subsequently pigging the pipeline with another pig having a full gauge body formed of a soft deformable foam wherein the body is reinforced by a lengthwise deformable stiffening member integrally centered in the pig body;
   (c) completing multiple subsequent pigging passes of a sequence of pipeline pigs through the pipeline with pipeline pigs provided with centered stiffening members of increasing diameter so that the last of the pipeline pigs traversing the pipeline has a largest centered stiffening member; and
   (d) recovering the dislodged internal coating from the pipeline by continuing flow through the pipeline during passage of the sequence of pipeline pigs.

12. The method of claim 11 wherein the centered stiffening members of the pigs increase in diameter from about ten percent to at least about seventy percent, but not one hundred percent of pig diameter.

13. The method of claim 12 wherein fluid is pumped through the pipeline at a pressure sufficient to keep the pipeline flow during the pigging operation.

14. The method of claim 11 including the step of cleaning the pipeline with an open cell full gauge pig formed of polyurethane foam having a density of up to about four pounds per cubic foot.

15. The set of pigs for cleaning an oil pipeline of collected paraffin coating the interior of the pipeline, comprising multiple pigs having:
   (a) an outer body of enabling full gauge wiping contact within the pipeline;
   (b) internally positioned stiffening members in said pig bodies which increase in relative size in the set of pigs; and
   (c) wherein all of the pigs provide full gauge wiping contact in the pipeline and all the pigs are formed to permit oil flow therepast on deforming.

16. The set of pigs of claim 15 wherein the outer body and stiffening members differ by at least about two pounds per cubic foot in density.

17. The set of pigs of claim 15 wherein the outer bodies have a foam material of density ranging from about two to about four pounds per cubic foot in density.

18. The set of pigs of claim 17 wherein the outer bodies are all made of open cell foam.

19. The set of pigs of claim 18 wherein the internally positioned stiffening members increase in diameter to about 80% of pig diameter.

* * * * *